Feb. 19, 1952   A. C. ROWLEY   2,586,720
DRY PIPE VALVE

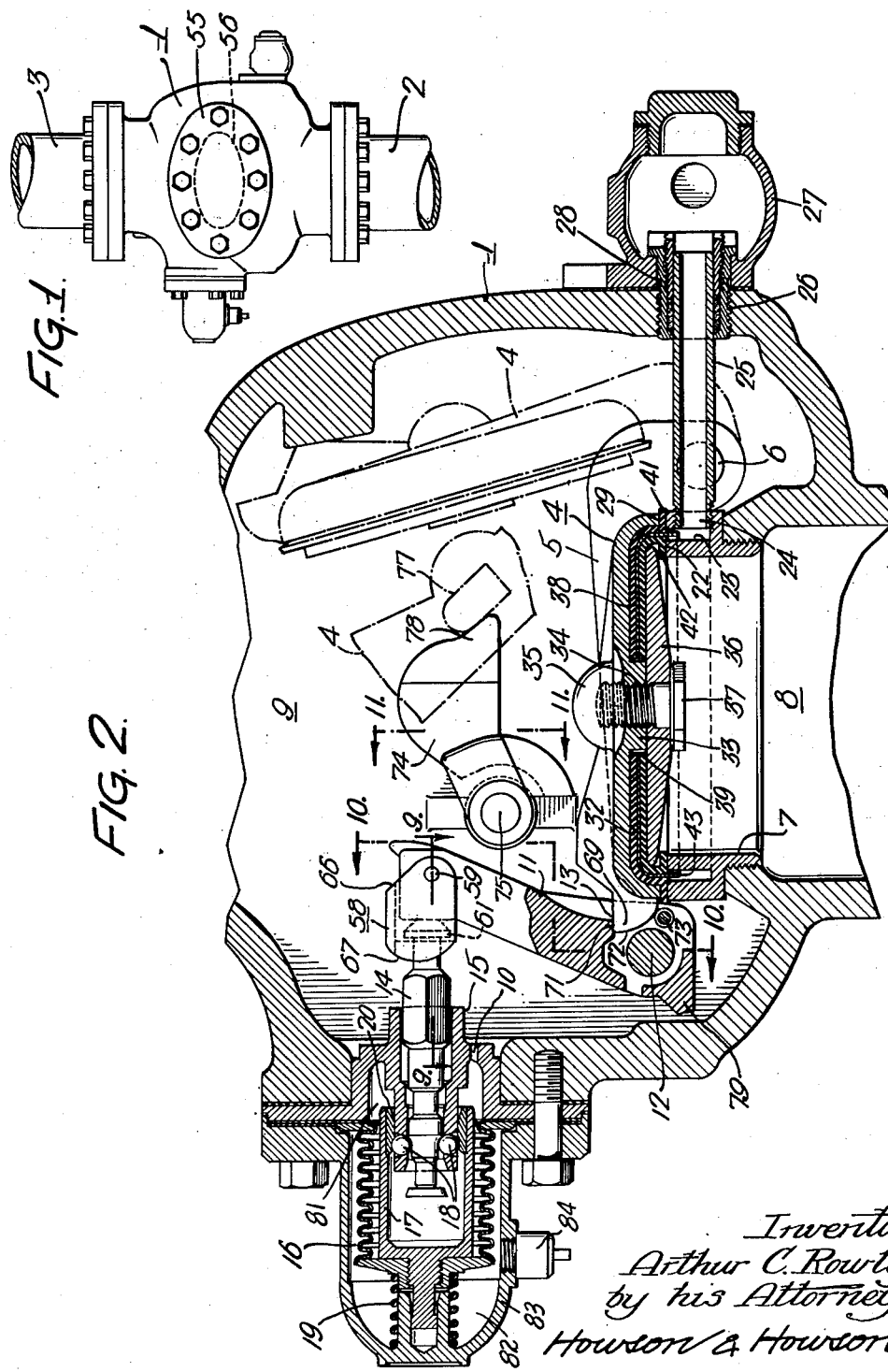

Filed July 21, 1950   3 Sheets-Sheet 2

Inventor:
Arthur C. Rowley
by his Attorneys
Howson & Howson

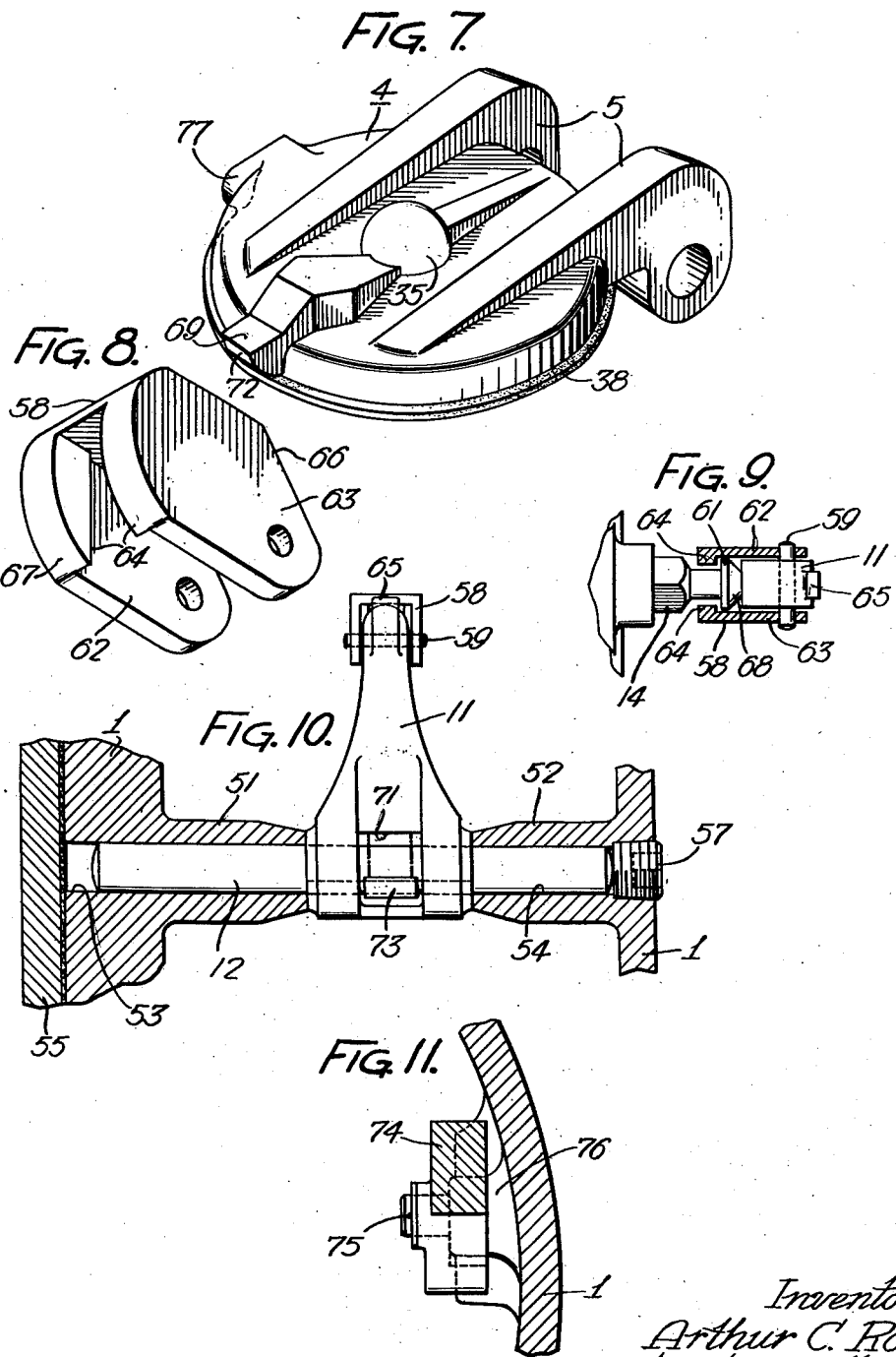

Patented Feb. 19, 1952

2,586,720

UNITED STATES PATENT OFFICE 2,586,720

DRY PIPE VALVE

Arthur C. Rowley, Drexel Hill, Pa., assignor to Globe Automatic Sprinkler Company, Philadelphia, Pa., a corporation of Pennsylvania Application July 21, 1950, Serial No. 175,151

8 Claims. (Cl. 169—19)

This invention relates to an improvement in valves of the type employed in dry pipe sprinkler systems, said valves functioning to separate the sprinkler system from the water supply main under normal conditions and comprising means operative automatically as a result of the opening of one or more of the sprinkler heads of said system to release the valve element for actuation by pressure of the water in the main to admit the water to the previously dry system.

An object of the invention is to provide a valve having superior functional properties as hereinafter set forth.

Another primary object is to provide improved means for releasably latching the valve element in seated position.

More specifically stated the invention contemplates provision in a simple and inexpensive assembly of a highly efficient, substantially foolproof latching device, as hereinafter described in detail.

A still further object is to provide novel means for releasably retaining the valve element in open position so as to preclude reseating of the element after initial actuation until such time as the dry pipe system is to be restored to operative condition.

The invention resides also in certain novel structural and mechanical details hereinafter described and illustrated in the attached drawings, wherein:

Fig. 1 is a side elevational view of a dry pipe valve made in accordance with the invention;

Fig. 2 is an enlarged fragmentary sectional view of the valve;

Fig. 7 is an enlarged view in perspective of the valve element or clapper;

Fig. 8 is an enlarged view in perspective of one of the valve latch elements;

Fig. 9 is a sectional view on the line 9—9, Fig. 2;

Fig. 10 is a sectional view on the line 10—10, Fig. 2, and

Fig. 11 is a sectional view on the line 11—11, Fig. 2.

Figure 3:
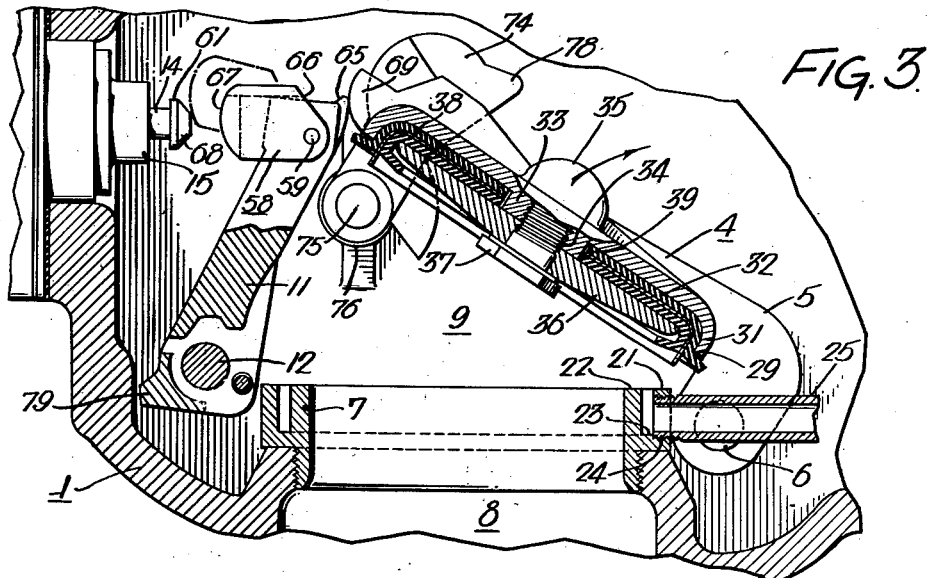
Fig. 3 is a corresponding sectional view showing the valve element in elevated position, but moving toward the seat after release from the supporting member.

With reference to the drawings, the valve comprises the usual casing 1 which in service is attached at the bottom to a water supply pipe or main 2 and at the upper end to the sprinkler system 3. Within the casing 1 is a valve element 4 which is mounted upon an arm 5 pivotally supported at 6 in the casing. Normally the valve element or clapper 4 will seat upon the upper end of a bushing 7 which is threaded into the inner end of the inlet port 8 of the casing which communicates with the main 2. When thus seated, the clapper separates the main from the chamber 9 in the upper portion of the valve casing which communicates with the dry pipe system 3. The clapper is normally maintained in seated position against the pressure of the water in the main by a latching lever 11 which is pivotally mounted upon a pin 12 in the casing and which engages the clapper 4 as indicated at 13, Fig. 2, said lever being retained under normal conditions in this valve locking position by means of a plunger 14 which is slidably mounted in a cylindrical guide 15 in the wall of the casing.

Under normal conditions air pressure in the chamber 9 acting upon the interior of a bellows diaphragm 16 through a port 10 connecting the chamber 9 with a chamber 81 which communicates with the interior of the diaphragm, maintains a slidably supported sleeve 17 in a relatively extended position wherein it acts through a cam 20 to maintain a number of small spherical elements 18 in position to engage the inner shouldered end portion of the plunger 14 so as to prevent retraction of the latter from the advanced latch-retaining position in which it is shown in Fig. 2. Release of the pressure within the chamber 9 resulting from opening of a sprinkler head tends to equalize the pressure in the interior chamber 81 with the atmospheric pressure in a chamber 82 between the bellows diaphragm 16 and the protective casing 83 for the diaphragm and permits a spring 19 at the outer end of the sleeve 17 to move that sleeve inwardly. The inward movement of the sleeve 17 releases the spherical elements 18 for radial displacement from the sides of the plunger 14 so that the plunger is released and will move outwardly under pressure exerted against the clapper 4 by the water in the main 8 acting through the latch lever 11. When the lever 11 is thus released, the clapper will be forced by the pressure of the water in the main 8 to a position shown in broken lines in Fig. 2, thereby admitting water to the dry pipe sprinkler system. To provide for atmospheric pressure within the chamber 82, a check valve 84 is provided in the lower wall of the casing 83. The valve 84 is normally open to the atmosphere and is adapted to be closed when the pressure in the chamber 82 exceeds a predetermined limit in the event that the diaphragm should break or develop a leak so as to permit liquid under pressure in the chamber 9 to enter the chamber 82. The above-described pressure-responsive means constitutes no part of the present invention.

The bushing 7 is provided with concentric seats 21 and 22 which are separated by a recess 23, said recess extending continuously around the circumference of the bushing. At one side the bushing has a port 24 which opens outwardly from the recess 23, said port being threaded for reception of one end of a pipe 25 the outer end of which extends through an opening 26 in the wall of the casing 1 and communicates with the interior of a fitting 27 attached to the outer side of said wall. The opening 26 is sealed by mean of a suitable stuffing box 28.

The valve element 4 has an annular seating surface 29 which is arranged for registration with the seat 21 of the bushing 7. The surface 29 defines the rim 31 of a dished recess 32 on the underside of the valve element, said element also having at the center of said recess a depending boss 33 which is provided with a tapped recess 34. The inner end of this recess lies within a protuberance 35 at the top of the valve body. A disc 36 is secured against the lower face of the boss 33 by means of a screw 37 threaded into the tapped hole 34 as illustrated in Figs. 2 and 3.

A dished gasket 38 is fitted to the recess 32 and has a central aperture 39 for the depending cylindrical boss 33. The gasket 38 is provided at its outer edge or rim with an outwardly projecting flange 41 which overlies the rim 31 so that when the valve is seated, this flange will be confined between the seating surface 21 of the bushing 7 and the opposed seating surface 29 of the valve element. The gasket 38 also comprises at its outer edge an inwardly projecting flange 42 which, when the valve is seated, contacts the inner seating surface 22 of the bushing. The gasket also has an annular flange 43 which projects downwardly centrally below the flanges 41 and 42 and is arranged to enter the recess 23 in spaced relation to both the inner and outer side walls of that recess. The gasket 38 is held in place in the recess 32 by the disc 36, which, as shown in Fig. 2, extends radially over the lower surface of the gasket to a position overlying the flange 42.

Figure 4:
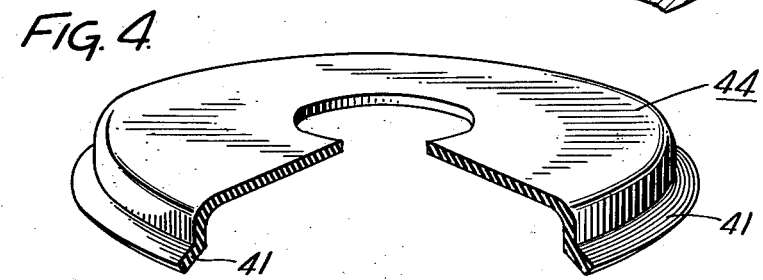
Figs. 4, 5 and 6 are views in perspective of separate elements of the gasket device, said elements being broken away in part to more clearly illustrate their structural form.
Figure 5:
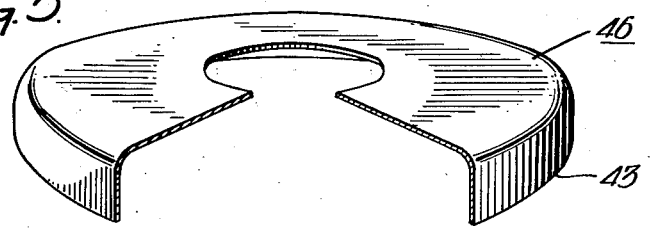
Figure 6:
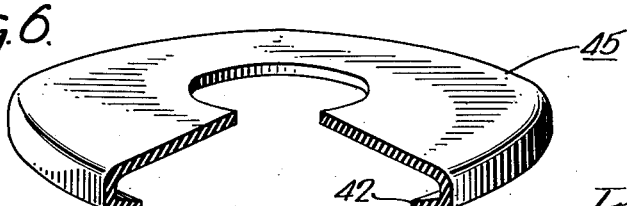

Preferably the gasket 38 is formed as illustrated in Figs. 4, 5 and 6 of three elements; an outer dished element 44 which may be of flexible rubber or other suitable material and which has at its outer edge or rim and integral therewith the out-turned flange 41; an inner dished element 45, this element also being composed of resilient rubber or other suitable gasket material and having integral therewith the inturned flange 42; and an intermediate dished element 46, this element being made of relatively thin metal or other suitable rigid or semi-rigid material and having as an integral part thereof the depending flange 43. In assembly, these elements are laid together in nested relation as illustrated and are held together by means of the clamping disc 36. They may be readily removed from the recess 32 of the valve element by removal of the screw 37 and disc 36 for replacement of all or any of the component dished elements. The above-described valve and gasket assembly is described in greater detail in divisional application, Serial No. 234,276, filed June 29, 1951.

With reference further to the device for retaining the valve element 4 seated against water pressure in the main, and with reference particularly to Fig. 10, it will be noted that the pin 12 which supports the lever 11 is mounted in bosses 51 and 52 which project inwardly from the opposite side walls of the casing 1 and which are provided with cylindrical bores, 53 and 54 respectively, for reception of the ends of the pin. Both bores extend completely through the wall of the casing, the outer end of the bore 53 being normally closed by a detachable cover element 55 on the casing 1, said cover normally closing a port 56 in the side of the casing 1 through which access may be had to the valve and associated elements in the interior of the casing. The outer end of the bore 54 is normally closed by a plug 57 threaded into the casing wall. It will be apparent that with this arrangement the pin 12 may be readily removed from the casing by first removing the cover 55 and the plug 57 and by then exerting pressure through the medium of a suitable tool on one end of the pin. Removal of the pin in this manner releases the latch lever 11 and permits withdrawal of the lever through the opening 56.

In accordance with the invention means is provided for mechanically detachably connecting the upper end of the lever 11 with the proximate end of the plunger 14. The connecting device consists of a bifurcated member 58 pivotally mounted on the lever through the medium of a pin 59 (see Figs. 2 and 8 to 10 inclusive), said member straddling the upper end of the lever 11 as best illustrated in Figs. 9 and 10 and projecting beyond the side of the lever so as to embrace a radially enlarged head 61 at the inner end of the plunger 14. As illustrated in Figs. 8 and 9, each of the bifurcations or sides 62 and 63 of the member 58 is provided toward its free end with an inturned shoulder 64 which overlaps the inner face of the head 61 and thereby interlocks the member 58 with the plunger in a manner such that oscillatory movement of the lever about the pivot pin 12 must normally be accompanied by an axial or longitudinal movement of the plunger 14.

It will be noted, however, that the lever may be disconnected from the plunger by adjustment of the member 58 clockwise about the pin 59 from the normal operative position in which the member is shown in Fig. 2, and in Fig. 3 the lever is shown thus disconnected from the plunger. In order to limit the clockwise angular movement of the member 58 from the normal position and to insure its return by gravity to the said normal position, the lever is provided at its upper end with a projecting lug 65 which is positioned for engagement with the rear inclined surface 66 of the member 58, it being noted that when the surface 66 is in contact with the lug 65 the member 58 will still occupy an unbalanced position from which it is returned by gravity to the normal position shown in Figs. 2 and 3. This simple interlocking device between the lever 11 and the plunger 14, while highly effective for the purpose of uniting these elements for their normal functions, still permits quick detachment of the lever from the plunger for removal of the lever from the assembly as described above.

In order to render this interlocking device foolproof, and to insure operativeness of the interlocked operative relation between the lever and plunger, the member 58 is formed so that movement of the lever 11 to the left from the position in which it is shown in Fig. 3 and resulting contact between the curved forward edges 67 of the member 58 and the conical surface 68 at the extremity of the plunger 14, will cam the member 58 upwardly about the pin 59 so as to bring the shoulders 64 into position above and behind the head 61 of the plunger, the member 58 then dropping into place by gravity to lock the parts together as previously described.

As previously noted, the lever 11 functions to retain the valve element 4 seated pending actuation of the valve by release of the pressure air in the sprinkler pipes. The operative position of the lever is illustrated in Fig. 2 wherein it will be noted that the projecting lug 69 on the valve body projects under a shoulder 71 on the lever. It will be noted also that the curved underside 72 of the lug 69 engages a pin 73 mounted in the lever, the function of this pin being hereinafter described. Assuming pressure air in the chamber 9 and also in the interior of the sleeve 17 within the bellows 16, the parts will be retained in the positions in which they are shown in Fig. 2, the air pressure functioning to extend the bellows 16 and thereby hold the cam element 20 of the sleeve 17 in operative position with respect to the spherical elements 18, holding those elements in place to lock the plunger 14 in the advanced position shown, and thereby holding the lever 11 in the operative position against the pressure of the water at the port 8. Release of the pressure air from the chamber 9, which occurs upon the opening of one of the sprinkler heads, will permit the spring 19 to collapse the Sylphon bellows 16 and move the sleeve 17 to the right, as viewed in Fig. 2, so as to release the spherical elements 18 and permit the plunger 14 to move to the left. Water pressure acting on the underside of the clapper 4 will then force the lever 11 counterclockwise around the pin 12 releasing the clapper 4 and permitting it to turn back under the influx of water to the dotted line position shown in Fig. 5.

In order to prevent the return of the clapper to its seat, except deliberately in the process of resetting the valve, I provide a pivoted member 74 which when in its normal position as shown in Fig. 2, functions to limit the return of the clapper 4 towards its seat. The member 74 is pivotally mounted on a pin 75 which projects inwardly from a boss 76 on the inner wall of the casing, as shown in Fig. 11, and is normally supported in the substantially horizontal operative position shown in Fig. 2. The outer end of the member 74 lies in the path of a lug 77 which projects from the side of the clapper 4 as best shown in Fig. 7 so that as the clapper is thrown back, as described above, the lug will engage the underside of the member 74 and will turn this element counterclockwise to the extent permitting the lug 77 to pass, the member 74 then returning to the normal position by gravity. In this position the outer end 78 of the member 74 again lies in the path of the lug 77 so that when the valve element drops back toward its seat the lug 77 will engage the end of the member 74 as indicated in broken lines in Fig. 2, whereby the return movement of the clapper will be interrupted. The clapper may be readily released, however, by elevation of the member 74 to which access may be had after removal of the cover 55 as previously described.

Let it be assumed that the flow of water to the port 8 has been stopped and that it is desired to return the system to normal service condition. With the cover 55 removed the member 74 is first elevated to release the clapper 4 so that it may return to its seat. As the clapper drops downwardly by gravity the curved surface 72 of the lug 69 of the clapper will first engage the inner surface of the lug 65 of the lever 11 as shown in Fig. 3 and will force that lever to the left so as to permit the clapper to continue its downward movement towards the seat. Subsequently the surface 72 of the clapper will forcibly engage the pin 73, the impact of the clapper then tending to carry the lever 11 to the right into the operative clapper-locking position shown in Fig. 2. It will be noted that at the beginning of this movement, i. e. at the moment the clapper 4 is released from the retaining member 74, the lever 11 will occupy a position determined by engagement of the projection 79 at the base of the lever with the adjoining wall of the casing. Normally the movement of the lever 11 into the operative position shown in Fig. 2 will also carry the plunger 14 to the right as viewed in that figure and into a position wherein subsequent movement of the sleeve 17 to the left will result in an advance of the spherical elements into operative plunger retaining position so that subsequent application of air pressure to the dry pipe system, transmitted to the interior of the bellows past the plunger 14, will act to lock the parts in the operative position shown in Fig. 2.

If in resetting the parts the member 58 has inadvertently been left unattached to the plunger 14 as shown in Fig. 3, the initial impact of the lug 69 on the lug 65 as described above will drive the lever 11 forcibly to the left and will effect an automatic connection of the member 58 with the plunger. If the connection fails on the initial impact, subsequent action of the clapper against the lever will invariably result in the interlocking of the member 58 with the head of the plunger so that when the clapper engages the pin 73 as described, the parts will be carried to the operative positions shown in Fig. 2.

The device described above affords a simple, substantially foolproof, and relatively inexpensive assembly, highly efficient in operation and readily assemblable and disassemblable as may be required.

I claim:

1. A dry pipe valve comprising a casing adapted for installation between fluid supply and dry pipe systems, a valve element movably supported in the casing and means providing a seat for said valve, said element being arranged for unseating by pressure of liquid in the supply system, and means for releasably retaining the valve element seated against said pressure, said retaining means including an element-retaining latch engageable with the valve element means on the valve element tending to displace the latch from the engaged position when the valve element is unseated by said liquid pressure, a movable member operable in an advanced position to hold the latch in valve retaining position against said displacing tendency, means for releasably interlocking said member with the latch for movement with the latter; and means responsive to fluid pressure in the dry pipe system for holding the member in the advanced position when the said system pressure exceeds a predetermined value, said pressure responsive means being releasable when the system pressure declines to permit the said member to move to a retracted latch-releasing position.

2. A dry pipe valve according to claim 1 wherein the interlocking means comprises a radially enlarged head on said member and a pivoted element on the latch having a recess for reception of said head to effect the interlock, said interlocking means being releasable by elevation of the recessed element about its pivot on the latch.

3. A dry pipe valve according to claim 2 including means on the latch for preventing elevation of the recessed element beyond a point wherein gravity will tend to return the element to an operative position with respect to the fluid pressure actuated member.

4. A dry pipe valve according to claim 3 wherein the radially enlarged head and recessed element are provided with coacting cam surfaces operative when the said member and element, after separation, are brought together toward the interlocked positions to move the element upwardly about its pivot to an extent admitting the said head to the recess.

5. A dry pipe valve according to claim 4 wherein the latch is mounted so as normally to assume a position in the path of the valve element as the latter moves from the open toward the seated position whereby impact of the element will tend to throw the latch away from the said normal position in the direction of the holding member.

6. A dry pipe valve according to claim 5 wherein the latch carries at its pivoted end an element engageable by the element as it moves to its seat so as to draw the latch toward the operative latching position.

7. A dry pipe valve according to claim 1 wherein the casing is provided with a port affording access to the valve element and the valve retaining elements, together with a releasable cover plate for said port.

8. A dry pipe valve according to claim 1 including retractable means for retaining the valve element in an elevated unseated position after initial elevation by the liquid pressure.

ARTHUR C. ROWLEY.

REFERENCES CITED

The following references are of record in the file of this patent:

UNITED STATES PATENTS

| Number | Name | Date |
|---|---|---|
| 1,822,655 | Hamilton | Sept. 8, 1931 |
| 1,917,000 | Tyden | July 4, 1933 |
| 1,947,309 | Rowley | Feb. 13, 1934 |
| 1,976,022 | Hutchinson | Oct. 9, 1934 |
| 2,357,133 | Rider | Aug. 29, 1944 |
| 2,475,489 | Gathercoal | July 5, 1949 |